United States Patent

[11] 3,616,044

| [72] | Inventor | Clifton L. Kehr |
| | | Silver Spring, Md. |
| [21] | Appl. No. | 734,545 |
| [22] | Filed | June 5, 1968 |
| [45] | Patented | Oct. 26, 1971 |
| [73] | Assignee | W. R. Grace & Co. |
| | | New York, N.Y. |

[54] PRECROSS LINKED ADHESIVE AND BONDING PROCESS UTILIZING SAME
4 Claims, No Drawings

[52] U.S. Cl............................................. 156/320,
156/330, 156/331, 156/332, 156/333, 156/334, 260/41 R, 260/88.1 PC
[51] Int. Cl............................................. C09j 5/10
[50] Field of Search............................................. 260/40, 41, 41 C, 88.1; 156/320

[56] References Cited
UNITED STATES PATENTS

| 2,683,103 | 7/1954 | Smook | 260/41 C |
| 3,226,356 | 12/1965 | Kehr et al. | 260/41 |
| 3,456,038 | 7/1969 | Newman et al. | 260/41 |
| 3,458,487 | 6/1969 | Mortimer | 260/41 |
| 3,470,079 | 9/1969 | D'Alelio | 260/40 |
| 3,234,197 | 2/1966 | Baum | 260/88.1 |

*Primary Examiner*—Morris Liebman
*Assistant Examiner*—S. M. Person
*Attorneys*—Richard P. Plunkett and Kenneth E. Prince ABSTRACT: This invention relates to precross-linked adhesives having a gel content of at least 4 percent comprising prior to cross-linking a thermoplastic polymeric material in combination with a source for generating free radicals and a process for forming a bond between contiguous surfaces of metallic elements using the aforesaid precross-linked adhesive.

3,616,044

PRECROSS-LINKED ADHESIVE AND BONDING PROCESS UTILIZING SAME

The art of forming side seams in cans has undergone considerable change in recent years. Previously, the side seam in cans was formed by soldering the marginal edge portion of the flat blank from which the body is made together with various solders such as 30 percent tin-70 percent lead or 2 percent tin-98 percent lead solder. The drawback with this system was that the soldering left a scorched area on the side seam of the can and additionally precluded printing or decorating on the entire outside of the can thereby necessitating the use of pasted paper labels. The more recent art has taught cementing side seams with various adhesives such as vinyl polymers and copolymers; acrylate and methacrylate polymers; urea-formaldehyde polymers; amine cured epoxy resins; polyamides and the like. These aforementioned adhesives have various drawbacks. One drawback is that the cemented side seam does not have a high bursting strength which is especially necessary when the cans contain products which must necessarily undergo subsequent treatments, e.g. the sterilization of fruits and vegetables or the pasteurization of beer at elevated temperatures. Another drawback is that these adhesives, although having good cohesive properties, have poor adhesive properties to metals. Thus, in most cases it is necessary to affix a primer coat or possible several coats to the metal surface prior to cementing the seam with said adhesives. Additionally, in some cases the adhesives employed require relatively long periods to harden, e.g. minutes and in some cases even hours. Hardening periods of such duration are completely unworkable and inoperable in present day can-making processes which produce cans at the rate of 200 to 600 or more cans per minute.

One method of forming metal cans with cemented side seams is already established in the prior art. This process (U.S. Pat. No. 2,970,077) utilizes a thermoplastic adhesive supported on one edge of the can blank which is molten when it enters the bodymaker (i.e., the machine which converts the flat metal blank into the shape of a cylinder or tube) but which is chilled during the bumping (pressure bonding) operation to a temperature below its melting point so that the cylindrical body will hold together at the overlap bonded seam area. Although this above described process is operable, it has at least one major disadvantage, namely, the operating conditions required to maintain just the right temperature prior to and following the chilled bumping operation are very critical and slight deviations from the optimum will result in poor bond strengths in the seam area and a high percentage of reject cans in the later stages of processing. Further, the time required for chilling the adhesive below its melting point is unduly long if one wants to maintain high production rates, e.g., at levels considerably above 300–400 cans/minute from a given bodymaker machine.

One object of the present invention therefore is to provide a new process for high-speed formation of side seam organic polymeric cemented cans which does not rely on chilling or crystallization from the melt to a point below the melting point of the polymer in order to set the thermoplastic adhesive to a high-strength condition. This new method in fact permits setting the thermoplastic adhesive to a high-strength condition at temperatures substantially above the melting point of the adhesive compound by a cross-linking process. With the latter technique the cylinders do not require clamping or other mechanical means of restraint upon leaving the bumping station of the bodymaker machine.

Cross-linking subsequent to the bumping (pressure bonding) step is inoperable unless the cylinder is held in the bonded position by mechanical means of restraint, e.g., clamped, after leaving the bumping station while heating the side seam to effect cross-linking.

Another object of this invention is to provide an adhesive which is precross-linked prior to use as a bond for uniting surfaces of metallic elements. Yet another object of the instant invention is to provide an overlaying side seam in a can body that retains its high bursting strength even on exposure to subsequent heating processes. Another object of the invention is to provide an adhesive side seam cement that will adhere to bare (i.e., metal or metal oxide containing) or surface-treated metal surfaces. Still another object of the invention is to provide a process for forming a side seam in a can body using conventional automatic high-speed can-making equipment. A further object of the invention is to provide an adhesive side seam cement for can bodies which forms an adhesive and cohesive bond within seconds. These and other objects will readily become apparent from a reading hereinafter.

In summary, the above and other objects are accomplished according to this invention by a novel cross-linked adhesive composition having a gel content of at least 4 percent which adhesive composition prior to cross-linking is a member of the group consisting of:

I.

a polar thermoplastic polymer having a softening point below 230° C. derived primarily from compounds of carbon and hydrogen and contains functional groups, said functional groups containing 1–60 percent by weight of the polar thermoplastic polymer of a hetero atom selected from the group consisting of phosphorus, oxygen, halogen, sulfur and nitrogen in combination with a source of free radicals, e.g., a free-radical-generating cross-linking agent or irradiation, and

II.

a thermoplastic polymer and 0.001 to 10 percent by weight of a free-radical-generating cross-linking agent selected from the group consisting of dioximes and diesters of dioximes.

The process utilizing the aforesaid adhesive compositions to bond surfaces of metallic elements comprises applying said adhesive composition to at least 1 of said surfaces, heating said adhesive composition to a temperature above the decomposition temperature of the cross-linking agent to cross-link the thermoplastic polymer to a gel content of at least 4 percent and thereafter bonding said surfaces by holding said surfaces contiguous with the cross-linked adhesive composition therebetween to allow wetting of said surfaces by the cross-linked adhesive composition.

The cross-linking step in the instant invention can be carried out prior to, concurrent with or subsequent to applying the adhesive composition to at least 1 of the metallic surfaces but in all cases the cross-linking of the adhesive composition is performed prior to bonding the metallic surfaces.

Examples of functional groups containing these polar elements in the polar thermoplastic polymer include but are not limited to, esters, amides, hydroxyl, amino, halogen, carbonate, sulfonate, sulfone, urethane, ethers, thioether and the like.

Examples of polar thermoplastic polymers and copolymers operable in this invention include, but are not limited to, copolymers of ethylene and acrylic acid, acrylic esters, acrylic amides, methacrylic acid, methacrylic esters, methacrylic amides, vinyl acetate, vinyl propionate; polyamides; polyesters; polyurethanes; polyureas; polycarbonates; polysulfones; polyethers; polythioethers; vinyl chloride polymers and copolymers; ethylene/vinylacetate/acrylic acid copolymers; ethylene/vinyl ester copolymers and the like. In addition, polyolefin polymers and copolymers to which have been grafted polymers of maleic acid or anhydries, esters or amides thereof are also included. Similarly graft copolymers of polyolefins with fumaric acid or anhydrides, esters or amides thereof are also operable in the instant invention. Ethylene/alkylmethacrylate, ethylene/alkylacrylate and vinylidene fluoride/hexafluoropropene copolymers are also included. Furthermore, polymers derived from alpha-olefins which have been further processed such as having been graft copolymerized, chlorinated, chlorosulfonated, oxidized, e.g. chlorosulfonated polyethylene described in U.S. Pat. No. 2,212,786 to contain new functional groups are also operable herein. For the most part, the examples herein will employ an ethylene/acrylic acid copolymer as the polar material for purposes of explanation.

Thermoplastic polymers operable herein would include, but are expressly not limited to, polyethylene, ethylene/diene copolymers, polypropylene, ethylene/propylene copolymers, ethylene/butylene copolymers, butyl rubber, and ethylene/propylene/diene terpolymers.

The source of free radicals can be various well-known chemical cross-linking agents such as organic peroxides, azo compounds, carbazates as taught in a copending application having Ser. No. 618,345, filed Feb. 24, 1968 and assigned to the same assignee, dioximes, diesters of dioximes and the like. Examples of operable organic peroxides include, but are not limited to, benzoyl peroxide; dicumyl peroxide; 2,5-dimethyl-2,5-di(t-butylperoxy)hexane; 2,5-dimethyl-2,5-di(t-butylperoxy)hexyne-3 and ditertiary bisperoxides of the general formula

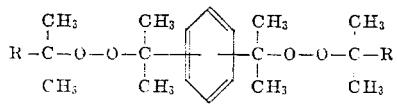

wherein R is a member of the group consisting of methyl and phenyl. Operable azo compounds include, but are not limited to, 2-phenylazo-2,4,4trimethylvaleramide; 2-phenylazoisobutyramide; 2-phenylazo-2,4,4-trimethylvaleronitrile; 2-phenylazo-2,4,4-trimethylvaleramide and the like.

Various operable carbazates include, but are not limited to, methyl carbazate, ethyl carbazate, t-butyl carbazate, phenyl carbazate, myristyl carbazate, and the like.

Examples of operable diesters of dioximes as cross-linking agents herein include but are not limited to 3-hexyne-2,5-dione dioxime diacetate; 3-methyl-3-hexene-2,5-dione dioxime dichlorobenzoate; 2-nitroterephthalaldehyde dioxime di-p-toluenesulfonic acid; dimethylglyoxime dimethanesulfonate; dimethylglyoxime dibutanesulfinate; dimethylglyoxime dibenzenesulfinate; dimethylglyoxime diphenylphosphinate; dimethylglyoxime dibutylphosphinate, dimethylglyoxime dichlorophosphinate; dimethyglyoxime diphenylcarbamate; dimethylglyoxime diethyl carbamate; 3-octen-5-yne-2,7-dione dioxime dibenzoate; 4-(1-butene-3-onyl) benzaldehyde dioxime dibenzoate; 4-(1-butyn-3-onyl) benzaldehyde dioxime diacetate; 4-(1-butyn-3-onyl) cinnamaldehyde dioxime dibutyrate; furil dioxime dibenzoate; 1-phenyl-1,2-propanedione dioxime diacetate; terephthalaldehyde dioxime dibenzoate; glyoxime dibenzoate; glyoxime diacetate; dimethylglyoxime diacetate; dimethylglyoxime dibenzoate and diphenylglyoxime dibenzoate and the free oximes from which the above esters are derived.

Examples of quinonoid-containing cross-linking agents include but are not limited to p-quinone dioxime dibenzoate and the free oxime from which the above ester is derived.

One advantage of utilizing the dioximes and diesteres of dioximes is that they not only cross-link the thermoplastic polymer in the adhesive composition but also promote adhesion between the polymeric material and the metal surfaces to be bonded as taught in a copending application having Ser. No. 721,559, filed Apr. 8, 1968 now abandoned and assigned to the same assignee. Thus, when these cross-linking agents are employed it is not necessary, but perfectly operable, to use a polar thermoplastic polymer to obtain adhesion between the polymer and the metallic or other surface. Nonpolar thermoplastics, e.g. polypropylene are suitable and operable.

The nonquinonoid-containing cross-linking agents have an advantage when used in accord with the instant invention in that they are substantially colorless compounds that result in substantially colorless adhesives or coatings. The quinonoid-containing adhesion-promoting agents are tan- to brown-colored compounds and when used with the polar copolymers of the instant invention yield adhesives or coatings which are dark brown to black in color. However, it is possible by the addition of pigments in an amount of 0.05 to 200 parts per 100 parts by weight of the quinonoid-containing adhesion-promoting agents, to obtain light-colored compounds that result in light-colored adhesives or coatings when using the quinonoid-containing adhesion-promoting agents. Examples of operable pigments include, but are not limited to, calcium carbonate, titanium dioxide, zinc oxide, magnesium carbonate, calcium silicate, calcium sulfate, barium sulfate, and aluminum hydroxide.

The amount of free-radical-generating cross-linking agent added to the polymeric material can vary over wide limits. Ordinarily, an amount of cross-linking agent in the range from 0.001 to 10 percent by weight of the polymeric material is added to the polymer, preferably 0.01 to 5 percent by weight.

Additionally, the polar thermoplastic polymeric material of the instant invention can be cross-linked by irradiation. A preferred feature of the irradiation operation of the instant invention is treatment with high-energy particle irradiation or by gamma-rays or X-rays. Irradiation-employing particles in the instant invention includes the use of positive ions, (e.g., protons, alpha particles and deuterons) electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G. E. resonant transformer, a synchrotron or the like. Furthermore, particle irradiation may also be supplied from radioactive isotopes or an atomic pile. Gamma rays or X-rays may be obtained from radio isotopes (e.g., cobalt 60) or by particle bombardment of suitable target material e.g., high-energy electrons on a gold metal target). The amount of high-energy radiation which is employed in irradiating the polymeric material in the instant invention can vary between broad limits. Radiation dosages of less than a megarad up to 20 megarads or more are operable, preferably 1 to 10 megarads are employed. The irradiation step can be performed at temperatures ranging from room temperature up to above the melting point of the polymer with the higher temperatures affording greater cross-linking efficiency.

The general procedure for forming a bond between an overlaying side seam in a can body comprises compounding the polymeric material with the chemical cross-linking agent by conventional means, e.g. a Banbury mill, a two-roll mill, an extruder or the like at a temperature above the processing temperature of the polymer but below the decomposition temperature of the cross-linking agent. If an extruder is employed the material can be extruded in the form of a ribbon or tape which can be applied directly onto at least one of the edge surfaces of a can blank. The polymeric material in the form of tape usually has a thickness in the range 3 to 10 mils and a width from one-sixteenth to one-fourth inch at the time it is affixed to the can body blank. The ribbon or tape is then cut to size by conventional means, e.g., by the method taught in U.S. Pat. No. 2,826,525. Additionally, at the time of fixing the tape to the body blank, the body blank is preferably preheated by conventional means, e.g., gas burners along the edge to which the tape is affixed to a temperature at least as high as the processing temperature of the polymeric material. Higher temperatures above the decomposition temperature of the cross-linking agent can also be employed if partial precuring of the affixed tape is desired at this time. However, temperatures in excess of 600° F. are usually avoided to preclude scorching or buckling the metal blank, or scorching and the discoloring the coatings thereon. Thus, if one so desires it is possible to preheat the blank momentarily to temperatures up to approximately 600° F. to obtain gel contents in the polymeric material up to 80 percent or more, preferably 4 to 50 percent so that when the blank is passed through the body maker, the cylinder thus formed will hold together and the opposite metal edge can still be wetted by the partially precross-linked polymer. Gel contents higher than 50 percent in a precross-linking operation lowers the ability of the opposing metal surface to be wetted by the polymer. Additionally, the adhesive composition in its final tape form can, if desired, be cross-linked after exiting the extruder but prior to or concurrent with applying it to at least one surface of the metallic element by heating the tape above the decomposition temperature of the free-radical-generating cross-linking agent or by irradiation. The body blank with the polymeric tape attached to one edge thereof is next passed to the body maker. Thereat it is preheated to a temperature above the decomposition temperature of the peroxide momentarily to insure that the polymeric material is cross-linked to at least a 4 percent gel content before passage into the body maker wherein the blank is curved around a mandrel into a cylinder to form an overlaying seam over the adhesive-containing edge. In said position, it is bumped together under pressure to form a bond between the overlying metal edges with the adhesive therebetween.

If it is desirous to use irradiation instead of chemical means to cross-link the polymer then the procedure is to merely extrude the polymeric material in the form of tape without any cross-linking agent being present at a temperature above the processing temperature of the polymer. The tape is then either irradiated prior to being affixed to the body blank or affixed to heated body blanks as in the prior method discussed supra for the cross-linking agent and cut off between blanks, the blank is passed normal to an irradiation beam which irradiates the tape adhering to one edge of the body blank to obtain a gel content in the adhesive composition just prior to bonding of at least 4 percent. The irradiation can be performed at temperatures ranging from room temperature up to and above the melting point of the polymeric material. Preferably, the edge of the body blank containing the adhesive polymeric material is heated to temperatures ranging from 200° to 600° F. For greater cross-linking efficiency. After irradiation the body blank containing the precross-linked polymeric material along one edge is passed into the body maker whereat it is formed into a cylinder and thereafter press bonded together in an overlaying seam with the adhesive therebetween under pressure for an instantaneous time interval to form a cemented side seam on the cylinder.

The amount of cross-linking necessary to form an adhesive and cohesive bond by the instant invention is that which will supply a gel content 4 percent to the polymeric material. Preferred gel contents range from 4–50 percent gel. Higher percentages of gel are also operable and obtainable but are unnecessary Amounts of gel lower than 4 percent will result in some side seams bursting on subsequent lacquer baking and pasteurization steps at elevated temperatures.

The amount of irradiation necessary to supply an operable gel content to the polymeric material is in the range of 0.1 to 20 megarads, preferably 1 to 10 megarads.

The metal surfaces to be united by the composition of the instant invention can be either untreated (bare metal or metal oxide surfaces) or surface treated. By the terms "surface treated" or "surface treatments" we mean the superposition on the metal surface of inorganic, organic or inorganic-organic layers or coatings of one sort or another, the purposes of said layers or coatings being to protect the metal surface from environmental corrosion, to protect the contents of the cans from contamination, or to decorate the can in an esthetic or practical manner. Examples of these surface treatments include but are not limited to chromium metal and/or chromium oxide species; phosphorus atoms or various phosphate compounds; zinc-containing primers; vinyl-based, butadiene-based, phenolic-based or epoxy-based lacquers and the like. If desired, a combination of two or more surface treatments can be employed in practicing this invention.

Various metals employed for making cans are operable and include, but are not limited to, aluminum, tin-free steel, tin plate, aluminum-coated steel, chromium-coated steel, surface-treated treated aluminum, surface-treated steel, and the like.

The following examples are set out to explain, but expressly not limit, the instant invention. Throughout the instant invention the melt indices (MI) were measured under the conditions specified in ASTM D 1258–52T and the densities of the polymers were measured under the conditions as specified in ASTM D 1505–60T.

The reduced viscosities (RSV) used herein were measured in decalin at 135° C. using the method described in ASTM D 1601–58T. The concentration of the polymer solution used to obtain the reduced viscosity was 0.1 g. polymer or copolymer/100 ml. decalin solution at 135° C.

The T-peel strength test to measure adhesion in pounds/linear inch (PLI) was in accord with the procedure of ASTM D 1876–61T using metal adherends 1 inch wide by 3 inches overall length (0.009 to 0.025 inch thick) with an adhesive layer 1½ "×1 " of a final bond thickness of 3 mils. The tests were run on a Scott Tensile Tester with a pull rate of 1 inch per minute at room temperature, i.e., 25° C.

The lap strength test to measure adhesion in pounds/square inch (p.s.i.) was run in accord with the procedure of ASTM D 1002–64 using metal or other adherends of ⅞ inches wide by 2⅞ inches overall length having a thickness of 0.009 to 0.025 inches. The adhesive layer was ¼"×¾" of 3 mils thickness. The tests were run on a Scott Tensile Tester or an Instron Tester at a pull rate of 1 inches per minute at room temperature, i.e., 25° C.

The percent gel content of the polymers of the instant invention was measured by refluxing a weighed sample (approximately 0.5 g.) of polymer in a cellulose Soxhlet thimble in xylene (containing 0.3 weight percent, 2,6-diteritary-butyl-4-methylphenol commercially available under the trade name "Ionol" from Shell Oil Corporation)for 24 hours. The insoluble portion of the polymer sample after drying was weighed to calculate percent gel as follows:

$$\text{Percent gel} = \frac{\text{weight insoluble sample}}{\text{total weight sample}} \times 100$$

In all examples, unless otherwise noted, a Brabender Plastograph Model PL-V2 equipped with a recording unit for measuring changes in torque was used for melt blend compounding of the adhesive composition.

The softening point of the polymeric material is defined herein as the minimum temperature at which the polymeric material can be processed by conventional means in an extruder or Banbury mill.

To duplicate the lacquer baking step in forming a can cylinder wherein after cementing the side seam, the can is lacquered and then baked in an oven thus requiring a force of 120 g./in. of seam to hold an unbonded body cylinder; bonded lap shear samples prepared from metal strips 2⅞"×¾"×6 mils with a ¼ inch cross-linked overlap having an overall length of 5½ inch were flexed by hand and inserted between horizontal supports 4½ inch apart to equate a force of 120 g. necessary to hold the seam closed. The thus-flexed seam between the horizontal supports were then placed in an oven at 170° C. for 6 minutes to duplicate actual baking conditions.

To duplicate pasteurization, cross-linked lap shear samples prepared from metal strips 2⅞ inch×¾inch ×6 mils with a ¼ inch cross-linked adhesive overlap were placed under a stress of 600 p.s.i. in water at 70° C. Samples that withstood the stress for 90 minutes were considered to have passed pasteurization, Example 1

100 parts of a commercially available ethylene/acrylic acid copolymer having a melt index of 0.5, a reduced specific viscosity of 0.69 and a density of about 0.930 sold under the trade name "Zetafax QX 3623.15" by Dow Chemical Co. were charged to a Brabender Plastograph and milled therein at 95°–100° C. for 5 minutes. The thus milled sample was pressed into sheet having a thickness of 7 mils on a platen press at 110° C. under 5,000 lbs. pressure. The sheet was subjected to irradiation from a Van de Graaff electron accelerator. The dosage, i.e. 4 megarads, was applied in a single 3-second pass under a Van de Graaff electron accelerator at a beam current of 250 microamperes and a voltage of 2 million volts. The thus-irradiated sheet had a gel content of 10 percent. The irradiated sheet was cut into strips to form an adhesive bond ¼"×¾"×3 mils between metal adherends of "Weirchrome" tin-free steel black plates each having a dimension of 2 ⅞"×¾"×7 mils thick. The adherends with the adhesive therebetween were pressed in a platen press under 5,000 lbs. pressure at 200° C. for 15 seconds to form an adhesive bond. Several samples were made up and cured in this fashion. The cured sample of the adhesive had a lap shear strength of > 1,700 p.s.i. Another cured sample was baked for 6 minutes at 170° C. in the modified baking oven after being flexed by hand and inserted between horizontal supports 4½inch apart. The adhesive joint was still intact after baking. The thus-baked sample was then placed under a stress of 600 p.s.i. in water at 70° C. for 90 minutes to reproduce a severe commercial pasteurization. The adhesive joint was still intact following 90 minutes of the pasteurization test. The thus-pasteurized adhesive joint was then subjected to a lap shear test resulting in a lap shear strength of 1,4000 p.s.i.

The following examples show the operability of the instant invention on an automatic can-making line.

Example 2

A commercially available ethylene/acrylic acid copolymer having a melt index of 0.5, a reduced specific viscosity of 0.69 and a density of 0.930 sold under the trade name "Zetafax QX 3623.15" by Dow Chemical Co. and 1.5 parts by weight of said copolymer of 2,5-dimethyl-2,5-di(t-butylperoxy)hexyne-3 sold under the trade name "Lupersol 130" by Wallace & Tiernan Inc. were charged to the hopper of a 1 inch NRM extruder machine equipped with a slot die one-half inch wide and 10 ml. thick. After about a minute residence time in the extruder at a temperature in the range 95°–100° C. the copolymer cross-linking agent mixture was extruded onto one of a pair of chilled driven rollers travelling at sufficient r.p.m. to draw down the extrudate in the form of a tape 7 mils thick and about three-sixteenth inch wide. The tape was passed between the rollers along with flat rectangular blanks sufficient in size to form conventional 12 oz. beer cans made of standard tin-free steel black plate which had been subjected to a surface treatment to yield a surface layer high in chromium content commercially available under the trade name "-Weirchrome" or CT Grade TFS from National Steel Co. Said blanks had previously been passed over gas burners to raise the temperature of the edge to be coated to about 500° F. to increase wettability and initiate cross-linking. The adhesive tape was transferred to the heated edge of the body blanks and the tape was cut between the blanks after exiting the rollers. The partially cross-linked adhesive-coated blanks just prior to entrance to the can-body-making machine were heated to about 600° F. on the underside of the adhesive-coated edge to insure a gel content of at least 4 percent in the polymer and on the opposing mating adhesive-free edge of the blank.

An adhesive-coated sample body blank after heating but just prior to entering the can-body-making machine on analysis had a gel content in excess of 8.0 percent. The blanks were passed through the body-making machine where they were formed or rolled into a tubular configuration to yield an edge overlap of one-fourth inch with the adhesive strip between said overlap. The overlap portion of the resulting cylinder was pressed together under pressure momentarily to form a cemented side seam lap joint 5"×¼"×3 mils thick in the can body.

The cemented seam area on the inside of the can body cylinder was then striped with a vinyl-based lacquer prior to being passed into the flanger which flared both ends of the cylinder.

Following the flanging step the total inside area of the cylinder was sprayed with a vinyl-based lacquer and was then baked at about 150°–170° C. for a period of about 5–10 minutes.

One end of the flanged cylinder was double seamed with a standard circular can end in the conventional fashion. The can was filled with beer and the other can end double seamed onto the flared body cylinder. The filled can was then heated for 20 minutes at 60° C. in a standard pasteurization process.

Using the above conditions the elements of the can-making operation were entirely successfully accomplished:
1. The cement was extruded at an application rate of 400 body blanks/minute or greater,
2. The cylinders were formed on the body maker at a rate of 400 blanks/minute or greater,
3. The successfully flanged and lacquer-coated cylinders were baked at 150°–170° C. for 5–10 minutes,
4. The cylinders were converted to finished cans filled with 2.6 volumes of beer and pasteurized for 20 minutes at 60° C., and
5. The pasteurized cans were stored at 40° C. for periods of time in excess of 4 weeks with no significant loss in carbonation pressure.

Example 3

When example 2 was repeated with no cross-linking agent present, several elements in the can-making process were not accomplished successfully. Specifically, the blanks coming off the body maker opened up at the side seam, i.e., they could not maintain their closed cylindrical configuration. Further, if the temperatures of the burners on the body maker were lowered to approximately 300°–400° F. so as to hold the cylinders together by virtue of the increased cement viscosity at the lower temperature, then the flanged, lacquer-coated cylinders opened up at the side seam when processed through the lacquer baking oven at 150°–170° C.

Example 4

Example 2 was repeated except that on exiting the extruder the copolymer-cross-linking agent mixture was heated to 225° C. for a short interval to obtain a cross-linked polymer tape having a gel content in excess of 15 percent. The results obtained were comparable to those obtained in example 2.

Example 5

A commercially available ethylene/acrylic acid copolymer having a melt index of 0.5, a reduced specific viscosity of 0.69 and a density of 0.930 sold under the trade name "Zetafax QX 3623.15" by Dow Chemical Co. was charged to the hopper of a 1 inch NRM extruder machine equipped with a slot die one-half inch wide and 10 ml. thick. After about a 1 minute residence time in the extruder at a temperature in the range 95°–100° C. the copolymer was extruded onto one of a pair of chilled driven rollers travelling at sufficient r.p.m. to draw down the extrudate in the form of a tape 7 mils thick and about one-fourth inch wide. The tape was passed between the rollers along with flat rectangular blanks sufficient in size to form conventional 12 oz. beer cans made of standard tin-free steel black plate which had been subjected to a surface treatment to yield a surface layer high in chromium content commercially available under the trade name "Weirchrome" or CT Grade TFS from National Steel Co. Said blanks had previously been passed over gas burners to raise the temperature of the edge to be coated to about 500° F. The adhesive tape was transferred to the heated edge of the body blanks and the tape was cut between the blanks after exiting the rollers. The coated edge of the body blank was then irradiated by means of a 500-kev. insulated core transformer (ICT) at a beam current of 1.0 milliampere at a distance of 5 inches from the beam scan over a 48-inch wide window in the direction of the width at a rate of 400 body blanks/min. This beam current and pass rate is equivalent to a dose of 4 megarads and yielded a gel content in the copolymer adhesive of 10 percent. The adhesive-coated irradiated blanks, just prior to entrance to the can-body-making machine were heated to about 600° F. on the underside of the coated edge and the opposing mating edge to increase wettability of the metal and gel content of the polymer. The blanks were passed through the body-making machine where they were formed or rolled into a tubular configuration to yield an edge overlap of one fourth inch with the adhesive strip between said overlap. The overlap portion of the resulting cylinder was pressed together under pressure momentarily to form a cemented side seam lap joint 5″×¼inch×″×3 mils thick in the can body.

The cemented seam area on the inside of the can body cylinder was then striped with a vinyl-based lacquer prior to being passed into the flanger which flares both ends of the cylinder.

Following the flanging step the total inside area of the cylinder was sprayed with a vinyl-based lacquer and was then baked at about 150°–170° C. for a period of about 5–10 minutes.

One end of the flanged cylinder was double seamed with a standard can end in the conventional fashion. The can was filled with beer and the other can end double seamed onto the flared body cylinder. The filled can was then heated for 20 minutes at 60° C. in a standard pasteurization process.

Using the above conditions the elements of the can making operation as set out in example 2 were entirely successfully accomplished.

Example 6

50 parts of a commercially available ethylene/acrylic acid copolymer having a melt index of 0.5, a reduced specific viscosity of 0.69 and a density of 0.930 and 50 parts of a commercially available ethylene/acrylic acid copolymer having a melt index of 5.0 and a density of 0.930 sold under the trade names of "Zetafax QX 3623.15" and "Zetafax QX 3623.7" respectively by the Dow Chemical Co. and 0.49 parts by weight of said copolymers of p-quinone dioxime dibenzoate were charged to a Brabender Plastograph and milled therein at about 95° C. for 15 minutes. The thus-milled copolymer material was then transferred to a platen press and pressed into strips of 7 mil thickness at 110° C. Said strips were then heated to 225° C. for 15 seconds on the platen press between sheets of "Teflon" to cross-link the polymer. The gel content of the cross-linked polymer was 24 percent. Samples for lap shear tests were made by placing a strip of the cross-linked adhesive between two "Weirchrome" adherends 2⅞″×¾″×7 mils thickness and pressed together in a platen press under 5,000 lbs. pressure at 200° C. for 15 seconds to give a cured adhesive surface of ¼″×¾″×3 mils thick. The adherends were cooled at room temperature and subjected to a lap strength test. The sample had a lap shear strength of 1,415 p.s.i. Another sample made up in the same way passed the baking step set out herein.

T-peel strength samples were made up using the cross-linked adhesive wherein an adhesive layer 1½″×1″×3 mils thick was formed between two "Weirchrome" adherends each 3″×1″×6 mils thick. The T-peel strength tests were run on a Scott Tensile Tester with a pull rate of 1 inch per minute at room temperature. The sample had a bond strength of 22 lbs./linear inch (p.l.i.).

Example 7

Example 6 was repeated except that 1.25 parts of 2,5-dimethyl-2,5-di(t-butylperoxy)hexyne-3 sold under the trade name "Lupersol 130"b by Wallace & Tiernan Inc. was substituted for the 0.49 parts of p-quinone dioxime dibenzoate. Under the same conditions of curing, bonding and testing, the cross-linked sample had a gel content of 19 percent, a lap shear strength of >1,500 p.s.i. and a peel strength of 20 p.l.i.

Example 8

Example 6 was repeated except that 1.5 parts of 2,5-dimethyl-2,5-di(t-butylperoxy)hexane sold under the trade name "Lupersol 101" by Wallace & Tiernan Inc. was substituted for the 0.49 parts of p-quinone dioxime dibenzoate.

The thus cross-linked adhesive between two "Weirchrome" adherends had a gel content of 35 percent, a lap shear strength of 1,200 p.s.i. and a peel strength of 15 p.l.i.

Example 9

Example 6 was repeated except that 1.5 parts of 1,3bis(t-butylperoxy isopropyl) benzene, i.e.

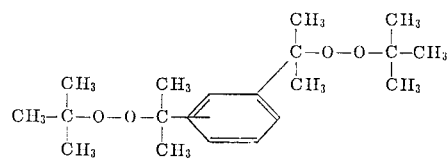

was substituted for the 0.49 parts of p-quinone dioxime dibenzoate. Under the same procedure of curing, adhering and testing, the sample had a lap shear strength of 1,600 p.s.i., a gel content of 30 percent and a peel strength of 18 p.l.i.

Example 10

Example 6 was repeated except that 1.0 parts of dicumyl peroxide was substituted for the 0.49 parts of p-quinone dioxime dibenzoate. Under the same procedure of curing, adhering and testing, the sample had a lap shear strength of 1,200 p.s.i., a gel content of 15 percent and a peel strength of 20 p.l.i.

Example 11

Example 6 was repeated except that 4 parts of t-butyl carbazate was substituted for the p-quinone dioxime dibenzoate. Under the same procedure of curing, adhering and testing, the sample had a lap shear strength of 1,200 p.s.i., a gel content of 10 percent and a peel strength of 20 p.l.i.

Example 12

Example 6 was repeated except that 4 parts of phenyl carbazate, was substituted for the p-quinone dioxime dibenzoate. Under the same procedure of curing, adhering and testing, the sample had a lap shear strength of 1,400 p.s.i., a gel content of 14 percent and a peel strength of 22 p.l.i.

Example 13

Example 6 was repeated except that 2 parts of 2-phenylazo-2,4,4-trimethylvaleramide

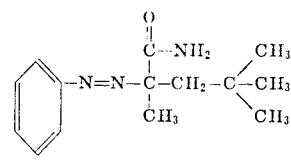

was substituted for the 0.49 parts of p-quinone dioxime dibenzoate. Under the same procedure of curing, bonding, and testing, the cross-linked sample had a gel content of 8 percent, a lap shear strength of 1,400 p.s.i. and a peel strength of 23 p.l.i.

The following examples in table I show comparative strengths of a precured adhesive versus an adhesive that is cured during and after bonding to the metal adherends with varying percentages of the cross-linking agent being present. In the precured samples the polymer and cross-linking agents were charged to a Brabender Plastograph and milled therein at 95° C. for 15 minutes. The samples were then sheeted out in a platen press at 110° C. until a thickness of 7 mils was obtained. Thereafter the samples were cured in a platen press between sheets of Teflon at 225° C. for 15 seconds. The thus-precured samples were then placed between "Weirchrome" or CT Grade TFS metal adherends and pressed together in a platen press for 15 seconds at 225° C. under 5,000 lbs. gauge pressure.

In the examples wherein the adhesive was cured simultaneously while being bonded to the metal adherends the procedure was as follows. The polymer material and the cross-linking agent were milled in a Brabender Plastograph at 95° C. for 15 minutes. The samples were then sheeted out to a 7 mil thickness on a platen press at 110° C. Strips of the uncured polymer-cross-linking compound were then placed between "-Weirchrome" metal adherends and pressed on a platen press at 225° C. for 15 seconds to form a cross-linked bond between the adherends simultaneously with the bond formation operation. The cooled samples were then tested for gel content, lap shear strength, and peel strength and ability to pass a pasteurization test by the procedures set out herein.

TABLE I

| Example Number | 14 | 15 | 16 | 17 | 18 | 19 | 20 |
|---|---|---|---|---|---|---|---|
| Formulation (parts by wt.): | | | | | | | |
| "Zetafax QX 3623.15" a | 50 | 50 | 50 | 50 | 50 | 50 | 50 |
| "Zetafax QX 3623.7" b | 50 | 50 | 50 | 50 | 50 | 50 | 50 |
| p-quinone dioxime dibenzoate | 0.0 | 0.18 | 0.33 | 0.49 | 0.65 | 1.0 | 1.3 |
| Percent gel (15 sec. cure at 225° C.) | | 3 | 9 | 24 | 40 | 51 | 60 |
| Peel strength (PLI): | | | | | | | |
| Uncured | 16 | 25 | 27 | 30 | 23 | 31 | 21 |
| Precured | 12 | 25 | 30 | 22 | 22 | 22 | 4 |
| Shear strength (p.s.i.): | | | | | | | |
| Uncured | 1,375 | >1,800 | >1,780 | >1,715 | >,1710 | >1,800 | 1,345 |
| Precured | 1,770 | 1,650 | 1,700 | 1,415 | 1,360 | 690 | 440 |
| Simulated baking oven test: c | | | | | | | |
| Uncured | F | | | P | P | P | P |
| Precured | F | | P | P | P | P | P | a An ethylene/acrylic acid copolymer having a melt index of 0.5, a reduced specific viscosity of 0.69 and a density of 0.930 commercially avaliable from Dow Chemical Co.
b An ethlene/acrylic acid copolymer having a melt index of 5.0, a reduced specific viscosity of 0.69 and a density of 0.930 commercially available from Dow Chemical Co.
c P=passed test; F=failed test.

Example 21

100 parts of a commercially available ethylene/acrylic acid copolymer having a melt index of 0.5, a reduced specific viscosity of 0.69 and a density of 0.930 sold under the trade name "Zetafax QX 3623.15" by Dow Chemical Co., 0.55 parts by weight of p-quinone dioxime dibenzoate and 10 parts by weight of $TiO_2$ were charged to a Brabender Plastograph and milled therein at about 95° C. for 15 minutes. The thus-milled sample was sheeted out in a platen press until it had a thickness of 7 mils at 110° C. The thus-sheeted material was cut into strips and said strips were cross-linked by being heated to 225° C. for 15 seconds on a platen press between sheets of "Teflon". The gel content of the cross-linked polymer was 30 percent. Samples for lap shear tests were made up by placing a strip of the cross-linked adhesive between two "Weirchrome" adherends 2⅞"×¾"×7 mils thick and pressed together in a platen press under 5,000 lbs. pressure at 200° C. for 15 seconds to give a cured adhesive surface of ¼"×¾"×3 mils thick. The adherends were cooled at room temperature and subjected to a lap strength test. The sample had a lap shear strength of 2,081 p.s.i. Another sample made up by the same procedure was subjected to the baking and pasteurization tests as set out herein. The sample passed both the baking and pasteurization test. After baking and pasteurization the sample had a lap shear strength of 1,320 p.s.i. Another sample was made up for the peel strength test as set out herein. The cross-linked polymer between the "-Weirchrome" adherends had a peel strength of 28 p.l.i.

Example 22

Example 21 was repeated except that 100 parts of an oxidized polyethylene having a carboxyl content of 0.9 milliequivalents carboxyl per gram was substituted for the ethylene/acrylic acid copolymer. The results were comparable to those obtained in example 21.

Example 23

Example 21 was repeated except that the metal "-Weirchrome" adherends were coated with a 0.2 mil coating of a polybutadiene derivative commercially available from E. I. duPont de Nemours & Co. under the trade name "Budium".

The resulting cured sample had a lap shear strength in excess of 1,800 p.s.i. and a gel content in excess of 20 percent.

The polymer compositions to be cured in accord with the present invention may, if desired, include such additives as antioxidants, fillers, pigments, antistatic agents, extending oil, plasticizers, tactifiers, and the like within the scope of this invention. Such additives are usually, but not necessarily, added to the adhesive composition by preblending prior to or during the compounding step. Operable fillers include carbon black, clay, silicate, alumina, carbonates, oxides, e.g. $TiO_2$, hydroxides, silicates, diatomaceous earth, talc, kaolin, barium sulfate, calcium sulfate, calcium carbonate and the like. The aforesaid additives may be present up to 200 parts or more per 100 parts of polymer by weight and preferably 0.001-100 parts on the same bases.

It is obvious that the process of the present invention can be used to join metallic elements other than the seam edges of cans or other containers. For example, it can be used to replace spot welding, soldering and brazing in the manufacture of components for industrial applications such as automobiles, airplanes, appliances, etc.

Further it is obvious that compositions other than metals can be joined together by the precess of this invention. Glass, wood, fabrics, leather, polymeric materials can be joined to themselves or to other substrates by the adhesive compositions of the instant invention.

In practicing this invention it is necessary that both the polar thermoplastic polymeric material and the thermoplastic polymeric material have softening points as defined herein below 230° C. in order to process same at temperatures whereat known cross-linking agents will not decompose during processing. Obviously, this is not a deterrent when irradiation is used to cross-link the polymer.

What is claimed is:

1. A method for uniting surfaces of elements with a cross-linked adhesive composition having a gel content in the range 4–50 percent which adhesive composition prior to cross-linking is a polar thermoplastic polymeric material having a softening point below 230° C. derived primarily from compounds of carbon and hydrogen and containing functional groups, said functional groups containing 1–60 percent by weight of the polar thermoplastic polymeric material of a hetero atom selected from the group consisting of phosphorous, oxygen, halogen, sulfur and nitrogen and 0.001–10 percent by weight of a free-radical-generating cross-linking agent which comprises applying said adhesive composition to only one of said surfaces, heating said adhesive composition to a temperature above the decomposition temperature of the cross-linking agent to cross-link the thermoplastic polymeric material to a gel content in the range 4–50 percent while said adhesive-containing surface is separated from said other surface and pressing said surfaces together with the precross-linked adhesive composition therebetween at a temperature of at least the softening point of the thermoplastic polymeric material prior to cross-linking, to bond said surfaces. while said adhesive-containing surface is separated from said other surface and pressing said surfaces together with the precross-linked adhesive composition therebetween at a temperature of at least the softening point of the thermoplastic polymeric material prior to cross-linking, to bond said surfaces.

2. The method according to claim 1 wherein the elements to be united are selected from the group consisting of metals, glass, wood, fabrics, plastics, rubbers and leather 3. The method according to claim 2 wherein the metal is selected from the group consisting of aluminum, tin-free steel, tin plate, aluminum-coated steel, chromium-coated steel, surface-treated aluminum and surface-treated steel.

4. The method according to claim 1 wherein the polar thermoplastic polymeric material is a copolymer of ethylene and a member of the group consisting of acrylic acid and methacrylic acid and the free-radical-generating cross-linking agent is p-quinone dioxime dibenzoate.

* * * * *

PO-1050
(5/69)

UNITED STATES PATENT OFFICE
CERTIFICATE OF CORRECTION

Patent No. 3,616,044　　　　　　　Dated October 26, 1971

Inventor(s) Clifton L. Kehr

It is certified that error appears in the above-identified patent and that said Letters Patent are hereby corrected as shown below:

Column 12, line 75, after the word "surfaces" add a -.- and delete the words "while said adhesive-". Column 13, lines 1-5; delete the words "containing surface is separated from said other surface and pressing said surfaces together with the precross-linked adhesive composition there between at a temperature of at least the softening point of the thermoplastic polymeric material prior to cross-linking, to bond said surfaces."

Signed and sealed this 21st day of March 1972.

(SEAL)
Attest:

EDWARD M. FLETCHER, JR.　　　　　　　　ROBERT GOTTSCHALK
Attesting Officer　　　　　　　　　　　　Commissioner of Patents